(12) United States Patent
Liu et al.

(10) Patent No.: US 8,934,364 B2
(45) Date of Patent: Jan. 13, 2015

(54) METHOD AND SYSTEM FOR ALIGNING EACH DISPATCHING SERVICE IN OPTICAL TRANSFER NETWORKS

(75) Inventors: Yang Liu, Shenzhen (CN); Xiaopeng Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 517 days.

(21) Appl. No.: 13/502,038

(22) PCT Filed: Sep. 25, 2010

(86) PCT No.: PCT/CN2010/077257
§ 371 (c)(1),
(2), (4) Date: Apr. 13, 2012

(87) PCT Pub. No.: WO2011/044817
PCT Pub. Date: Apr. 21, 2011

(65) Prior Publication Data
US 2012/0207471 A1    Aug. 16, 2012

(30) Foreign Application Priority Data

Oct. 16, 2009    (CN) .......................... 2009 1 0236035

(51) Int. Cl.
| | |
|---|---|
| H04L 12/28 | (2006.01) |
| H04Q 11/00 | (2006.01) |
| H04J 3/06 | (2006.01) |
| H04J 3/16 | (2006.01) |
| H04J 1/16 | (2006.01) |

(52) U.S. Cl.
CPC .......... *H04Q 11/0067* (2013.01); *H04J 3/0691* (2013.01); *H04J 3/1652* (2013.01); *H04J 2203/0012* (2013.01); *H04Q 11/0071* (2013.01); *H04Q 2011/0064* (2013.01)
USPC ........................... 370/252; 370/389; 370/519

(58) Field of Classification Search
USPC ......................................... 370/252, 389, 519
See application file for complete search history.

(56) References Cited

U.S. PATENT DOCUMENTS 7,778,162 B2 * 8/2010 Yu ................................. 370/223

FOREIGN PATENT DOCUMENTS

| CN | 1842221 A | 10/2006 |
|---|---|---|
| CN | 101001476 A | 7/2007 |
| CN | 101137246 A | 3/2008 |
| CN | 101674146 A | 3/2010 |
| JP | 2006-041921 A | 2/2006 |

OTHER PUBLICATIONS

PCT International Search Report for PCT/CN2010/077257 mailed Dec. 16, 2010.

* cited by examiner

*Primary Examiner* — John Pezzlo
(74) *Attorney, Agent, or Firm* — Sutherland Asbill & Brennan LLP

(57) ABSTRACT

The present invention discloses a method for aligning each scheduling service in an optical transport network. When a cross scheduling unit in a cross board sends service data to each service board, inserts a frame header indication signal into the sent service data, data frames in the sent service data are aligned according to the frame header indication signal, each service board performs a delay to the above service data according to a service delay time when receiving the service data and extracting the frame header indication signal, after the delay time is up, encapsulates the service data to be scheduled and sends to the cross broad to be cached, aligned and scheduled. The present invention also discloses a system for aligning each scheduling service in an optical transport network.

11 Claims, 2 Drawing Sheets

METHOD AND SYSTEM FOR ALIGNING EACH DISPATCHING SERVICE IN OPTICAL TRANSFER NETWORKS

CROSS REFERENCE TO RELATED APPLICATIONS

This application claims the priority benefit of PCT/CN2010/077257 filed on Sep. 25, 2010 and Chinese Application No. 20090236035.4 filed on Aug. 16, 2009. The contents of these applications are hereby incorporated by reference in their entirety.

TECHNICAL FIELD

The present invention relates to a service processing technology in an optical network, and particularly, to a method and system for aligning each scheduling service in an optical transport network.

BACKGROUND OF THE RELATED ART

With the development of the Optical Transport Network (OTN), based on more and more cross scheduling applications of services of the OTN, and based on demands of total service cross capacity and scheduling flexibility, the cross scheduling is generally implemented by adopting a time slot cross mode.

When the time slot cross mode is adopted, the scheduled services are required to adopt the same clock, and frame headers should be aligned before the scheduled services are sent to a cross scheduling unit, thus each time slot in the services can be scheduled. However, if offset of the frame headers between the services to be scheduled are very large, it is required to use a cache with very large capacity before the cross scheduling unit to implement an aligning of each path of service, in which the implementation cost is much higher.

The traditional method for aligning the frame headers before each path of service is sent to the cross scheduling unit is: to provide a frame header indication signal (FP) for an access board of each path of service, which is used to serve as a sending standard of each path of service, so that the offset of the frame header of each path of service is very small before each path of service enters the cross scheduling unit and it is only needed to uses very small cache to complete the aligning of the frame header of each path of service to be scheduled. However, the method needs to provide the independent frame header indication signal for the access board of each path of service, and thus, with the increasing of services required cross scheduling, if the independent frame header indication signal is provided for all the access boards of all paths of services, lots of independent signal wires are needed which causes difficulties in design of the whole system.

SUMMARY OF THE INVENTION

In view of this, the main purpose of the present invention is to provide a method and system for aligning each scheduling service in an optical transport network, which can implement that the frame header of each path of service data is basically aligned before scheduling while the number of signal wires of each service board is greatly reduced.

In order to achieve the above purpose, the technical scheme of the present invention is implemented as follows.

A method for aligning each scheduling service in an optical transport network implemented in the present invention comprises:

a cross board inserting a frame header indication signal into service data sent to each service board;

aligning data frames in the sent service data according to the frame header indication signal, and sending the service data containing the frame header indication signal to each service board;

each service board receiving the service data, and when extracting the frame header indication signal, performing a delay according to service delay time;

each service board encapsulating and sending the service data to be scheduled after the delay time is up; and the cross board receiving the service data of each service board, caching and aligning the service data.

In the above scheme, the frame header indication signal is a set periodic pulse signal. and the period of the pulse signal is identical with a period of frame header information of the data frames in the sent service data.

In the above scheme, the extracting the frame header indication signal is: extracting a pulse signal from the received service data according to the frame header information of the data frames to obtain the frame header indication signal.

In the above scheme, the each service board encapsulating and sending the service data to be scheduled is: each service board encapsulating the service data to be scheduled according to a protocol of a transport network in which the service data to be scheduled is located, and sending to the cross board after the encapsulation is completed.

In the above scheme, the caching and aligning is: the cross board caching the received service data of each service board, and further aligning the frame header of each service data in a cache according to the frame header indication signal.

In the above scheme, after further aligning the frame header of each service data, the method further comprises: the cross board scheduling and sending all the service data after a cached data volume reaches a set maximum caching data volume.

A system for aligning each scheduling service in an optical transport network implemented in the present invention comprises:

a cross board, which is configured to insert a frame header indication signal into service data sent to each service board, align frame header of each service data according to the frame header indication signal, and send to each service board; and is further configured to cache and align the service data sent from each service board; and a service board, which is configured to extract the frame header indication signal from the received service data. after extracting the frame header indication signal, perform a delay according to service delay time, and encapsulate and send the service data to be scheduled after the delay.

In the above scheme, the system further comprises: a frame header indication provision unit, configured to generate the frame header indication signal to provide the frame header indication signal for the cross board.

In the above scheme, the cross board further comprises:

a frame header insertion unit, which is configured to insert the frame header indication signal into the service data sent by the cross board to each service board;

a service sending unit, which is configured to align the frame header of the service data to be sent to each service board according to the frame header indication signal, and send the service data containing the frame header indication signal to each service board; and an aligning unit, which is configured to cache the service data of each service board, and further align the frame header of each service data according to the frame header indication signal in a cache.

In the above scheme, the service board further comprises:

a frame header indication extraction unit, which is configured to extract the frame header indication signal from the received service data, and trigger a delay unit after extracting the frame header indication signal;

a delay unit, which is configured to perform the delay according to a pre-set delay time; a service encapsulation unit, which is configured to, after the delay time is up, encapsulate the service data to be scheduled according to a protocol of a transport network in which the service data to be scheduled is located; and a sending unit, which is configured to send the encapsulated service data to be scheduled to the cross board.

In the above scheme, the cross board further comprises:

a cross scheduling unit, which is configured to, after performing a cross scheduling on the service data, send the service data to the service sending unit; and the aligning unit, which is further configured to send each service data in the cache to the cross scheduling unit after the cached data volume reaches a set maximum caching data volume.

With the method and system for aligning each scheduling service in the optical transport network provided by the present invention, the cross board inserts the frame header indication signal into the service data sent to each service board, and after aligning the data frames in the sent service data according to the frame header indication signal, sends to each service board; each service board performs the delay according to service delay time when receiving the service data and extracting the frame header indication signal, encapsulates and sends the service data to be scheduled after the delay time is up; and the cross board caches and aligns the service data of each service board, and then schedules and sends. Thus, before the cross board schedules each path of service, each service board does not need an independent signal wire for providing the frame header indication signal, and is able to basically align frame headers of the service data sent by each path, which is convenient to design the system and provides convenience for capacity expansion of the cross scheduling capacity based on the optical transport network.

PREFERRED EMBODIMENTS OF THE PRESENT INVENTION

The basic idea of the present invention is that: a cross board inserts a frame header indication signal into the service data sent to each service board, and after aligning the data frames in the sent service data according to the frame header indication signal, sends to each service board; each service board performs a delay according to service delay time when receiving the service data and extracting the frame header indication signal, encapsulates and sends the service data to be scheduled after the delay time is up; and the cross board caches and aligns the service data of each service board, and then schedules and sends.

Wherein, the frame header indication signal is specifically a set periodic pulse signal, and a period of the pulse signal is identical with a period of frame header information of the data frames in the sent service data, which is provided by a frame header indication provision unit. For example, when a cross scheduling is performed in the 2nd generation Optical Transport Network (OTN2), the frame header indication provision unit provides a pulse signal of which the period is identical with the period of frame header information (OA1OA2) in the OTN2 overhead to serve as the frame header indication signal. The OTN2 supports 64-bit wide data, and the transmission speed is 255/237×9953280 kbit/s.

The present invention will be further described in detail with reference to the accompanying drawings and specific embodiments.

Figure 1:
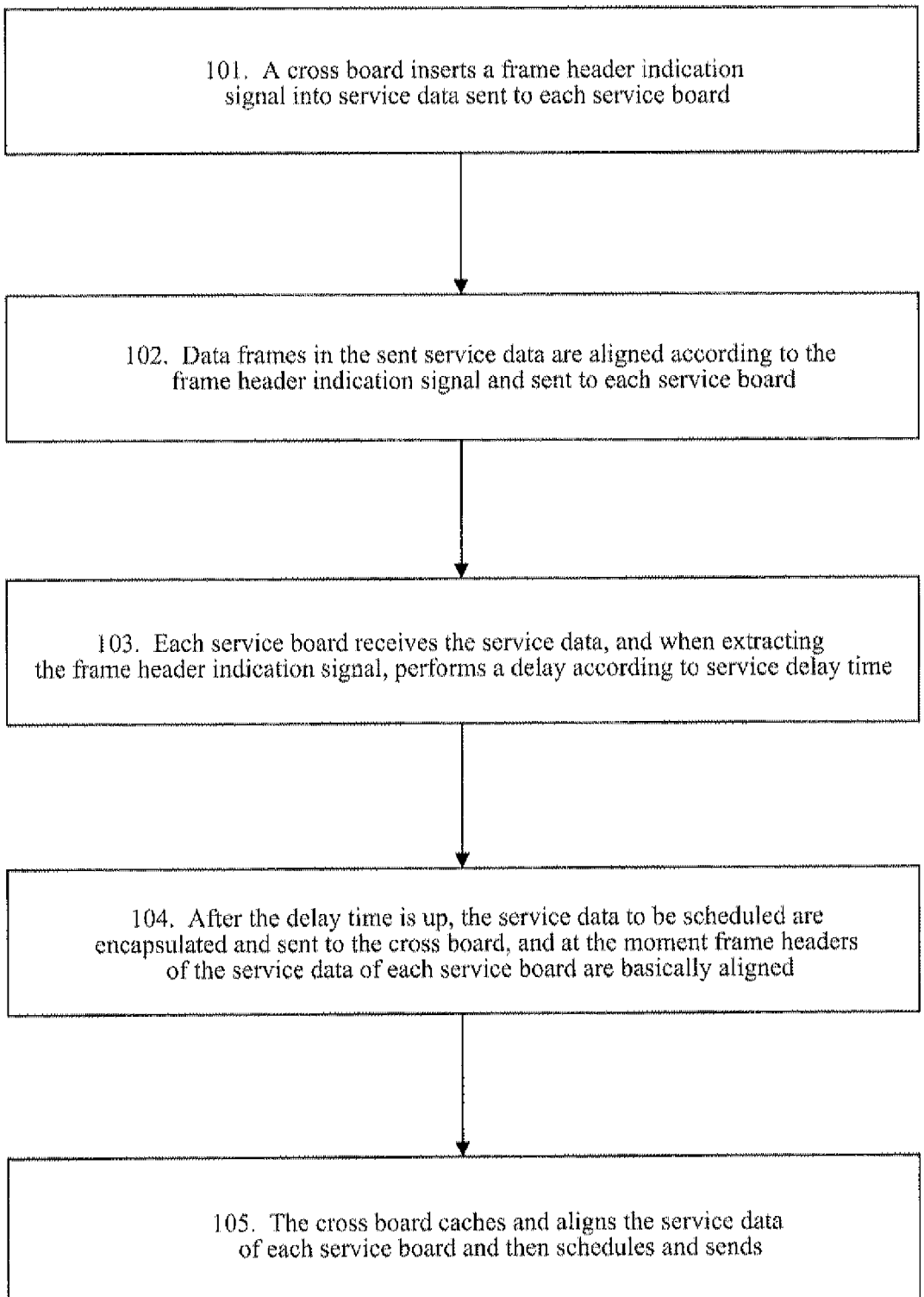
FIG. 1 is a flow chart of a method for implementing aligning of each scheduling service in an optical transport network according to the present invention.

The method for implementing aligning of each scheduling service in the optical transport network according to the present invention is as shown in FIG. 1, and the method comprises the following steps.

In step 101, a cross board inserts a frame header indication signal into service data sent to each service board.

Specifically, when a cross scheduling unit in the cross board receives the service data of each service board, the frame headers in services are not aligned, and the cross board inserts the frame header indication signal into the sent service data after scheduling the frame headers.

In step 102, the data frames in the sent service data are aligned according to the frame header indication signal and sent to each service board.

Specifically, after inserting the frame header indication signal into the sent service data, all the frame headers of the data frames are aligned to the frame header indication signal, and the aligned service data is sent to each service board according to the scheduling of the cross scheduling unit.

In step 103 each service board receives the service data, and performs a delay according to service delay time when extracting the frame header indication signal.

Specifically, each service board receives the service data, extracts a pulse signal from the received service data according to the frame header information of the data frames, to obtain the frame header indication signal, and performs the delay according to the service delay time after extracting the frame header indication signal;

wherein, the service delay time is an interval time of two frame header indication signals, i.e., frame header indication signal period—caching delay—cross scheduling delay; the caching delay is the time of the data volume cached in the cross board reaching a preset maximum caching data volume of the cross board. Generally, the period of OA1OA2 is taken as the period of the frame header indication signal in the OTN2, when the period of OA1OA2 is the period of 2040 clocks, a data volume with period of 50 clocks may be set as the maximum caching data volume of the cross board; and the cross scheduling delay is the time required for the cross scheduling unit performing scheduling of each service, is generated according to the performance of the hardware of the cross scheduling unit itself, and is generally period of 30 clocks.

In step 104, after the delay time is up, the service data to be scheduled are encapsulated and sent to the cross board, and at the moment the frame header of the service data of each service board is basically aligned.

Specifically, after the delay time is up, each service board encapsulates the service data to be scheduled according to a protocol of a transport network in which the service data to be scheduled is located. For example, in the OTN2, the service data to be scheduled is encapsulated according to a frame format of the OTN2, and sent to the cross board after the encapsulation is completed; because the delay time of each service board is fixed and is the same, and the aligning is also performed according to the frame header indication signal before the delay, thus the frame header of the sent service data of each service board is basically aligned.

In step 105, the cross board caches and aligns the service data of each service board, and then schedules and sends.

Specifically, the cross board caches the service data of each service board, further aligns the frame headers of service data according to the frame header indication signal in a cache, and after the cached data volume reaches the set maximum caching data volume, sends all the service data in the cache to the cross scheduling unit to be scheduled and sent.

Figure 2:
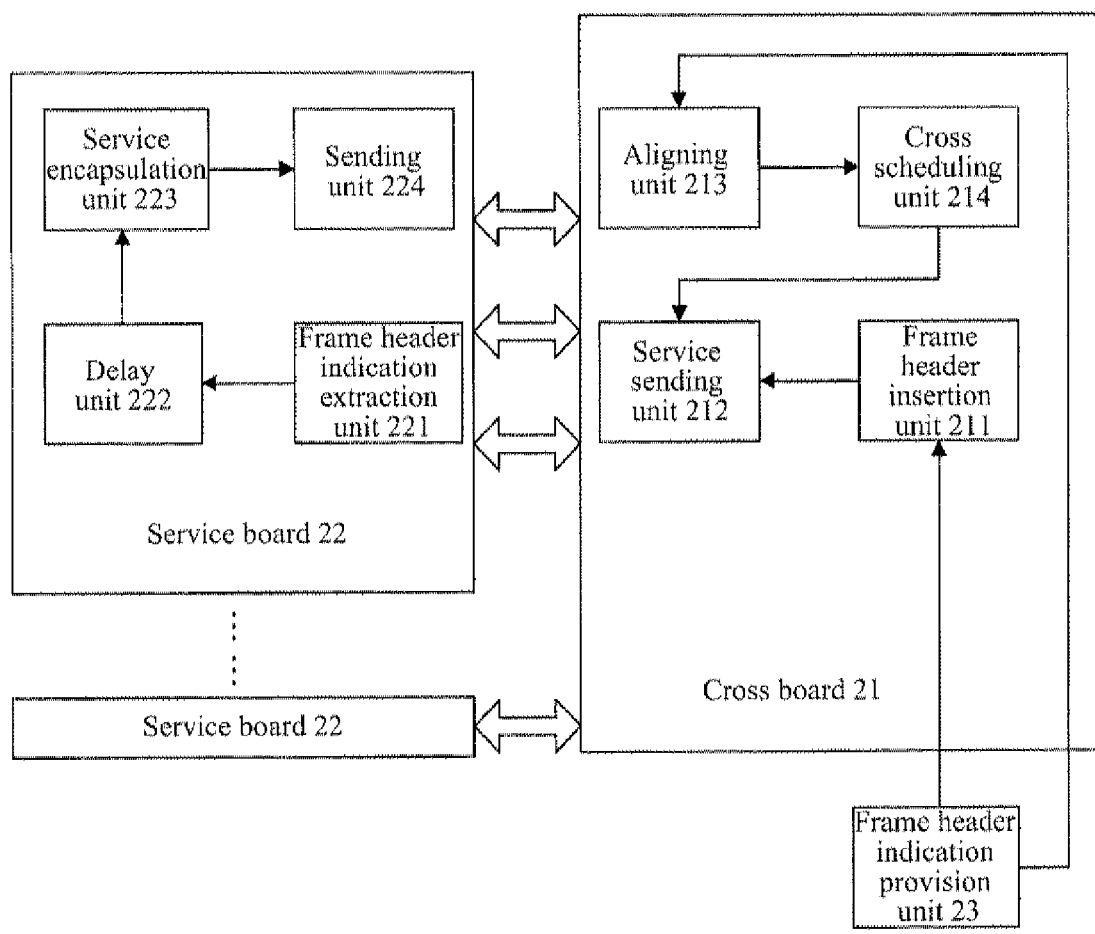
FIG. 2 is a structure diagram of a system for implementing aligning of each scheduling service in an optical transport network according to the present invention.

On the basis of the above method, the present invention also provides a system for aligning each scheduling service in an optical transport network, and as shown in FIG. 2, the system comprises several following parts: a cross board 21 and a service board 22; wherein, the cross board 21, used to insert a frame header indication signal into service data sent to each service board 22, and after aligning a frame header of each service data to be sent according to the frame header indication signal, send to each service board 22; and also used to cache and align the service data sent from each service board 22; and the service board 22, used to extract the frame header indication signal from the received service data, perform a delay according to service delay time after extracting the frame header indication signal, and encapsulate and send the service data to be scheduled after the delay.

The system further comprises a frame header indication provision unit 23, which is used to set a periodic pulse signal as the frame header indication signal to provide to the cross board 21, wherein a period of the pulse signal is identical with the period of frame header information of the data frames in the sent service data.

The cross board 21 further comprises a frame header insertion unit 211, a service sending unit 212 and an aligning unit 213; wherein.

the frame header insertion unit 211, used to insert the frame header indication signal into the service data sent by the cross board 21 to each service board 22;

the service sending unit 212, used to align the frame header of the service data to be sent to each service board 22 according to the frame header indication signal, and send the service data containing the frame header indication signal to each service board; and the aligning unit 213, used to cache the service data of each service board 22, and further align the frame header of each service data according to the frame header indication signal in a cache.

The service board 22 further comprises a frame header indication extraction unit 221, a delay unit 222, a service encapsulation unit 223 and a sending unit 224; wherein, the frame header indication extraction unit 221, used to extract the pulse signal from the received service data according to the frame header information of the data frames to obtain the frame header indication signal, and trigger the delay unit 222 after extracting the frame header indication signal;

the time delay unit 222, used to perform the delay according to a pre-set delay time; wherein, the delay time is frame header indication signal period—caching delay—cross scheduling delay;

the service encapsulation unit 223, used to encapsulate the service data to be scheduled according to a protocol of a transport network in which the service data to be scheduled is located after the delay time is up; and the sending unit 224, used to send the encapsulated service data to be scheduled to the cross board 21.

The cross board 21 further comprises a cross scheduling unit 214; wherein, the cross scheduling unit 214. used to, after performing a cross scheduling on the service data, send the service data to the service sending unit 212;

the aligning unit 213 is further used to send each service data in the cache to the cross scheduling unit 214 after the cached data volume reaches the set maximum caching data volume.

With the method of the present invention, when aligning the frame header of the service data sent by each service board, each service board does not need an independent signal wire for providing the frame header indication signal, which is convenient to design the system, and can implement that the frame header of each path of service data is basically aligned before scheduling while the number of signal wires of each service board is greatly reduced.

The above description is only the preferred embodiments of the present invention, which is not used to limit the protection scope of the present invention. All the modifications, equivalents and improvements, etc., made within the spirit and principle of the present invention shall fall into the protection scope of the present invention.

What is claimed is:

1. A method for aligning each scheduling service in an optical transport network, comprising:
    a cross board inserting a frame header indication signal into service data sent to each service board;
    aligning data frames in the sent service data according to the frame header indication signal, and sending the service data containing the frame header indication signal to each service board;
    each service board receiving the service data, and when extracting the frame header indication signal, performing a delay according to service delay time;
    each service board encapsulating and sending the service data to be scheduled after the delay time is up; and
    the cross board receiving the service data of each service board, caching and aligning the service data.

2. The method according to claim 1, wherein, the frame header indication signal is a set periodic pulse signal, and a period of the pulse signal is identical with a period of frame header information of the data frames in the sent service data.

3. The method according to claim 2, wherein, the extracting the frame header indication signal is: extracting a pulse signal from the received service data according to the frame header information of the data frames to obtain the frame header indication signal.

4. The method according to claim 1, wherein, the each service board encapsulating and sending the service data to be scheduled is: each service board encapsulating the service data to be scheduled according to a protocol of a transport network in which the service data to be scheduled is located, and sending to the cross board after the encapsulation is completed.

5. The method according to claim I, wherein, the caching and aligning is: the cross board caching the received service data of each service board, and further aligning the frame header of each service data in a cache according to the frame header indication signal.

6. The method according to claim 5, wherein, after further aligning the frame header of each service data, the method further comprises: the cross board scheduling and sending all the service data after a cached data volume reaches a set maximum caching data volume.

7. A system for aligning each scheduling service in an optical transport network, comprising:
    a cross board, which is configured to insert a frame header indication signal into service data sent to each service board, align frame header of each service data according to the frame header indication signal, and send to each service board; and is further configured to cache and align the service data sent from each service board; and a service board, which is configured to extract the frame header indication signal from the received service data, after extracting the frame header indication signal, perform a delay according to service delay time, and encapsulate and send the service data to be scheduled after the delay.

8. The system according to claim 7, further comprising: a frame header indication provision unit, configured to generate the frame header indication signal to provide the frame header indication signal for the cross board.

9. The system according to claim 8, wherein, the cross board further comprises:
   a frame header insertion unit, which is configured to insert the frame header indication signal into the service data sent by the cross board to each service board;
   a service sending unit, which is configured to align the frame header of the service data to be sent to each service board according to the frame header indication signal, and send the service data containing the frame header indication signal to each service board; and
   an aligning unit, which is configured to cache the service data of each service board, and further align the frame header of each service data according to the frame header indication signal in a cache.

10. The system according to claim 9, wherein, the cross board further comprises:
    a cross scheduling unit, which is configured to, after performing a cross scheduling on the service data, send the service data to the service sending unit; and
    the aligning unit, which is further configured to send each service data in the cache to the cross scheduling unit after the cached data volume reaches a set maximum caching data volume.

11. The system according to claim 8, wherein, the service board further comprises:
    a frame header indication extraction unit, which is configured to extract the frame header indication signal from the received service data, and trigger a delay unit after extracting the frame header indication signal;
    a delay unit, which is configured to perform the delay according to a pre-set delay time;
    a service encapsulation unit, which is configured to, after the delay time is up, encapsulate the service data to be scheduled according to a protocol of a transport network in which the service data to be scheduled is located; and
    a sending unit, which is configured to send the encapsulated service data to be scheduled to the cross board.

* * * * *